(12) United States Patent
Dong et al.

(10) Patent No.: US 11,827,102 B2
(45) Date of Patent: Nov. 28, 2023

(54) HYBRID POWER SYSTEM AND ALL-TERRAIN VEHICLE

(71) Applicant: SEGWAY TECHNOLOGY CO., LTD., Jiangsu (CN)

(72) Inventors: Zhen Dong, Jiangsu (CN); Shuting Yan, Jiangsu (CN)

(73) Assignee: Segway Technology Co., Ltd., Jiangsu (CN)

( * ) Notice: Subject to any disclaimer, the term of this patent is extended or adjusted under 35 U.S.C. 154(b) by 164 days.

(21) Appl. No.: 17/473,273

(22) Filed: Sep. 13, 2021

(65) Prior Publication Data
US 2022/0080822 A1    Mar. 17, 2022

(30) Foreign Application Priority Data
Sep. 14, 2020   (CN) .......................... 202010961679.6

(51) Int. Cl.
*B60K 6/543*   (2007.10)
*B60K 6/365*   (2007.10)
(Continued)

(52) U.S. Cl.
CPC .............. *B60K 6/543* (2013.01); *B60K 6/365* (2013.01); *B60K 17/165* (2013.01); *F16H 9/26* (2013.01);
(Continued)

(58) Field of Classification Search
CPC ...... B60K 6/543; B60K 6/365; B60K 17/165; B60Y 2200/20; B60Y 2200/92; F16H 9/26
See application file for complete search history.

(56) References Cited

U.S. PATENT DOCUMENTS 6,383,114 B1 * 5/2002 Hoshiya .................... B60K 6/52
                                                      903/910
8,775,043 B2 * 7/2014 Imaseki ................ B60W 10/08
                                                      701/67
(Continued)

FOREIGN PATENT DOCUMENTS

EP          2127984 A1    12/2009

OTHER PUBLICATIONS

European Patent Office, Search Report for EP application 21196347.5, dated Feb. 15, 2022.

*Primary Examiner* — John D Walters
(74) *Attorney, Agent, or Firm* — Timothy W. Menasco, Esq.; Harter Secrest & Emery LLP

(57) ABSTRACT

A hybrid power system includes: an engine; a continuously variable transmission, power being transferred between the continuously variable transmission and the engine; a first transmission, power being transferred between the first transmission and the continuously variable transmission; a first main decelerator, power being transferred between the first main decelerator and the first transmission; a first half shaft, power being transferred between the first half shaft the first main decelerator; a motor; a second transmission, power being transferred between the second transmission and the motor; a second main decelerator, power being transferred between the second main decelerator and the second transmission; and a second half shaft, power being transferred between the second half shaft and the second main decelerator, one of the first half shaft and the second half shaft being a front half shaft, and the other thereof being a rear half shaft.

19 Claims, 4 Drawing Sheets

(51) Int. Cl.
 *F16H 9/26* (2006.01)
 *B60K 17/16* (2006.01)
(52) U.S. Cl.
 CPC ....... *B60Y 2200/20* (2013.01); *B60Y 2200/92* (2013.01)

(56) References Cited

U.S. PATENT DOCUMENTS

| | | | |
|---|---|---|---|
| 10,118,477 B2 * | 11/2018 | Borud | B60K 6/442 |
| 10,639,983 B2 * | 5/2020 | Takaki | B60K 6/52 |
| 10,780,770 B2 * | 9/2020 | Kohler | B60K 6/40 |
| 2017/0355259 A1 | 12/2017 | Borud et al. | |
| 2018/0264928 A1 | 9/2018 | Takaki et al. | |
| 2020/0108709 A1 | 4/2020 | Kohler et al. | |

* cited by examiner

HYBRID POWER SYSTEM AND ALL-TERRAIN VEHICLE

CROSS-REFERENCE TO RELATED APPLICATIONS

This application is based on and claims priority to Chinese Application No. 202010961679.6, filed on Sep. 14, 2020, the entire contents of which are incorporated herein by reference for all purposes.

TECHNICAL FIELD

This application relates to the field of all-terrain vehicles and, more particularly, to a hybrid power system and an all-terrain vehicle.

BACKGROUND

At present, all-terrain vehicles on the market are fuel-powered, most of which adopt belt-CVT (continuously variable transmission) systems. However, such transmission systems have low transmission efficiency, and heat generated raises temperature of a CVT box, causing a belt to work in a high temperature environment and break easily.

In addition, fuel power generally cannot enter a high-efficiency zone until above 5000 rpm, and the vehicle starts with low efficiency and high fuel consumption. Therefore, improvement in mechanical efficiency of all-terrain vehicles and transmission efficiency of the transmission system are research orientations in the industry. The all-terrain vehicles in the related art are fuel-powered and transmit power to front and rear wheels through CVT transmission systems and front and rear axles to realize the four-wheel drive.

Moreover, most hybrid power vehicles in the related art adopt two-wheel drive. The advantages of the hybrid power vehicles over conventional fuel vehicles are not obvious due to plenty of harmful emissions caused by parking or short-term parking and light load conditions, and it is difficult to arrange various components of the vehicle when trying to integrate an engine and a motor.

SUMMARY

A hybrid power system according to embodiments of the present disclosure includes: an engine; a continuously variable transmission, power being transferred between the continuously variable transmission and the engine; a first transmission, power being transferred between the first transmission and the continuously variable transmission; a first main decelerator, power being transferred between the first main decelerator and the first transmission; a first half shaft, power being transferred between the first half shaft the first main decelerator; a motor at least for outputting power; a second transmission, power being transferred between the second transmission and the motor; a second main decelerator, power being transferred between the second main decelerator and the second transmission; and a second half shaft, power being transferred between the second half shaft and the second main decelerator, in which one of the first half shaft and the second half shaft is a front half shaft, and the other of the first half shaft and the second half shaft is a rear half shaft.

A hybrid power system according to the present disclosure includes: an engine; a continuously variable transmission fixed on a first axial side of the engine, power being transferred between the continuously variable transmission and the engine; a first transmission fixed on a second axial side of the engine, power being transferred between the first transmission and the continuously variable transmission; a first transmission shaft, power being transferred between a first end of the first transmission shaft and the first transmission; a first main decelerator, power being transferred between the first main decelerator and a second end of the first transmission shaft; a first half shaft, power being transferred between the first half shaft and the first main decelerator; a motor at least for outputting power; a second transmission, power being transferred between the second transmission and the motor; a second main decelerator, power being transferred between the second main decelerator and the second transmission, and the second transmission being fixed between the motor and the second main decelerator; a second half shaft, power being transferred between the second half shaft and the second main decelerator, in which one of the first half shaft and the second half shaft is a front half shaft, and the other of the first half shaft and the second half shaft is a rear half shaft.

A hybrid power system according to the present disclosure includes: an engine; a continuously variable transmission fixed on an axial side of the engine, power being transferred between the continuously variable transmission and the engine; a first transmission, power being transferred between the first transmission and the continuously variable transmission; a first main decelerator, power being transferred between the first main decelerator and the first transmission, and the first transmission being fixed between the engine and the first main decelerator; a first half shaft, power being transferred between the first half shaft and the first main decelerator; a motor at least for outputting power; a second transmission, power being transferred between the second transmission and the motor; a second main decelerator, power being transferred between the second main decelerator and the second transmission, and the second transmission being fixed between the motor and the second main decelerator; a second half shaft, power being transferred between the second half shaft and the second main decelerator, in which one of the first half shaft and the second half shaft is a front half shaft, and the other of the first half shaft and the second half shaft is a rear half shaft.

An all-terrain vehicle according to embodiments of the present disclosure includes a hybrid power system. The hybrid power system includes: an engine; a continuously variable transmission, power being transferred between the continuously variable transmission and the engine; a first transmission, power being transferred between the first transmission and the continuously variable transmission; a first main decelerator, power being transferred between the first main decelerator and the first transmission; a first half shaft, power being transferred between the first half shaft the first main decelerator; a motor at least for outputting power; a second transmission, power being transferred between the second transmission and the motor; a second main decelerator, power being transferred between the second main decelerator and the second transmission; and a second half shaft, power being transferred between the second half shaft and the second main decelerator, in which one of the first half shaft and the second half shaft is a front half shaft, and the other of the first half shaft and the second half shaft is a rear half shaft.

BRIEF DESCRIPTION OF THE DRAWINGS

These and/or other aspects and advantages of the present disclosure will become apparent and readily appreciated from the following descriptions to the embodiments with reference to the drawings, in which.

DETAILED DESCRIPTION

Embodiments of the present disclosure will be described in detail below, and the embodiments described with reference to the drawings are exemplary. The embodiments of the present disclosure will be illustrated below.

A hybrid power system 100 according to embodiments of the present disclosure will be described below with reference to FIGS. 1 to 6. The present disclosure also proposes an all-terrain vehicle having the hybrid power system 100.

Figure 1:
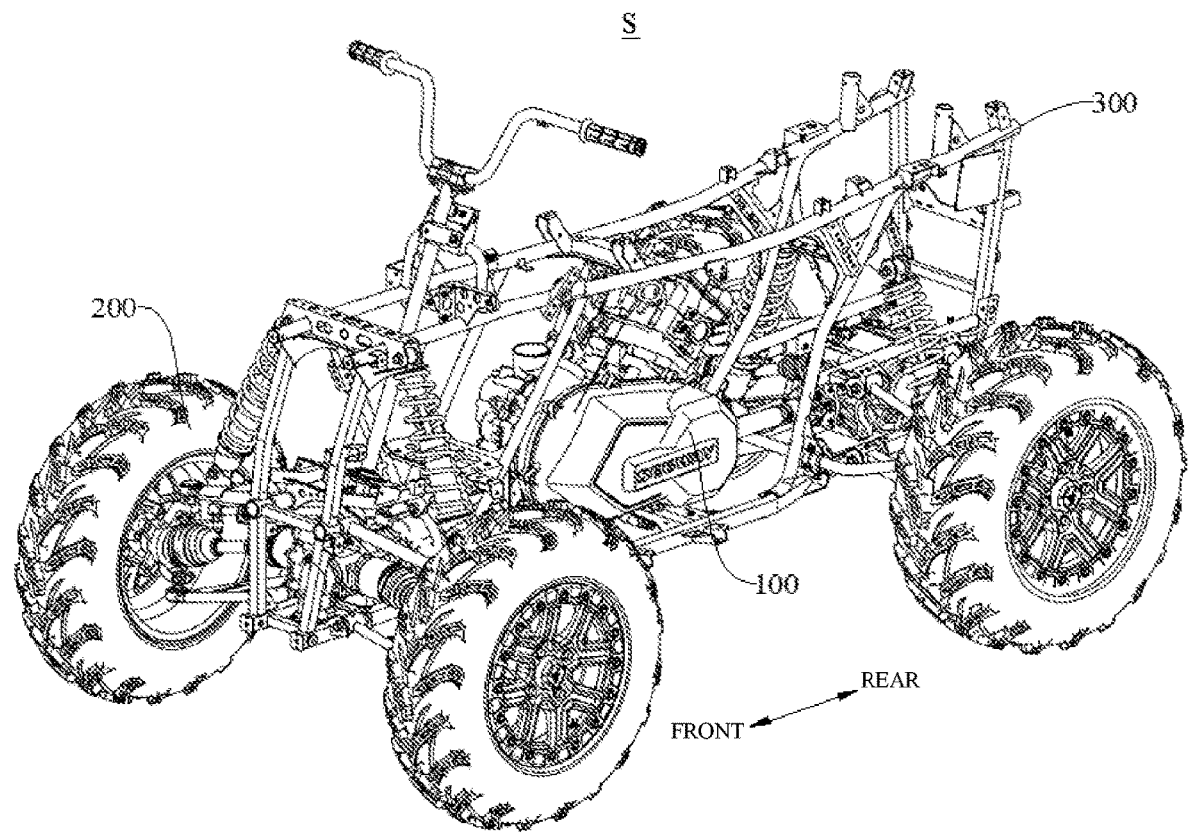
FIG. 1 is a schematic view of an all-terrain vehicle according to an embodiment of the present disclosure.
Figure 2:
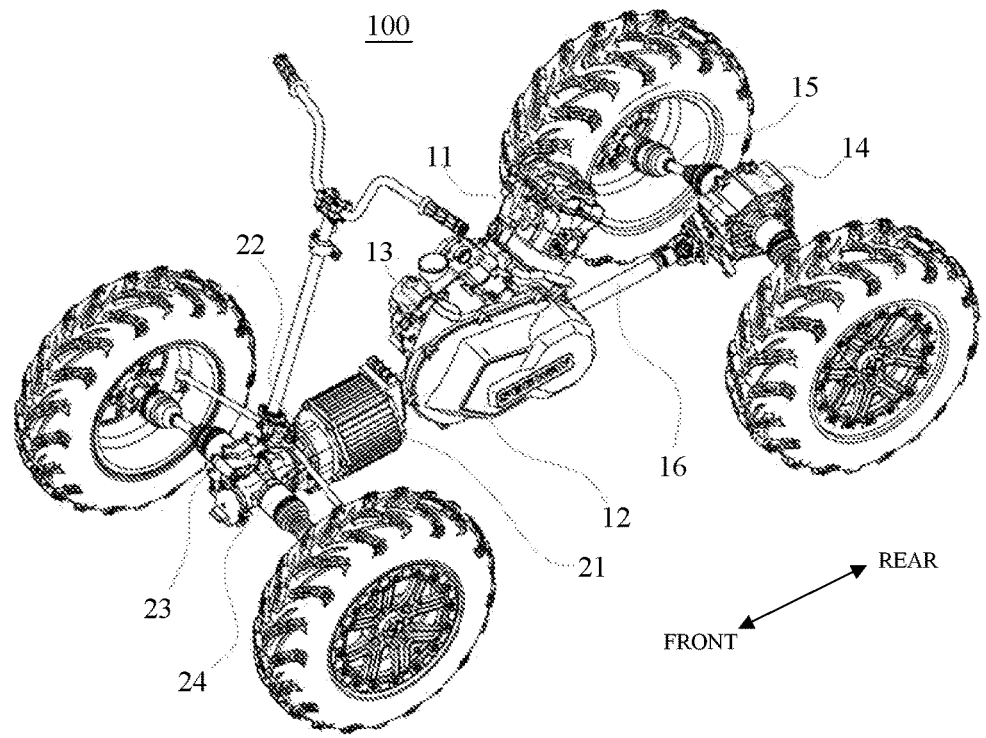
FIG. 2 is a schematic view of a hybrid power system according to some embodiments of the present disclosure.
Figure 3:
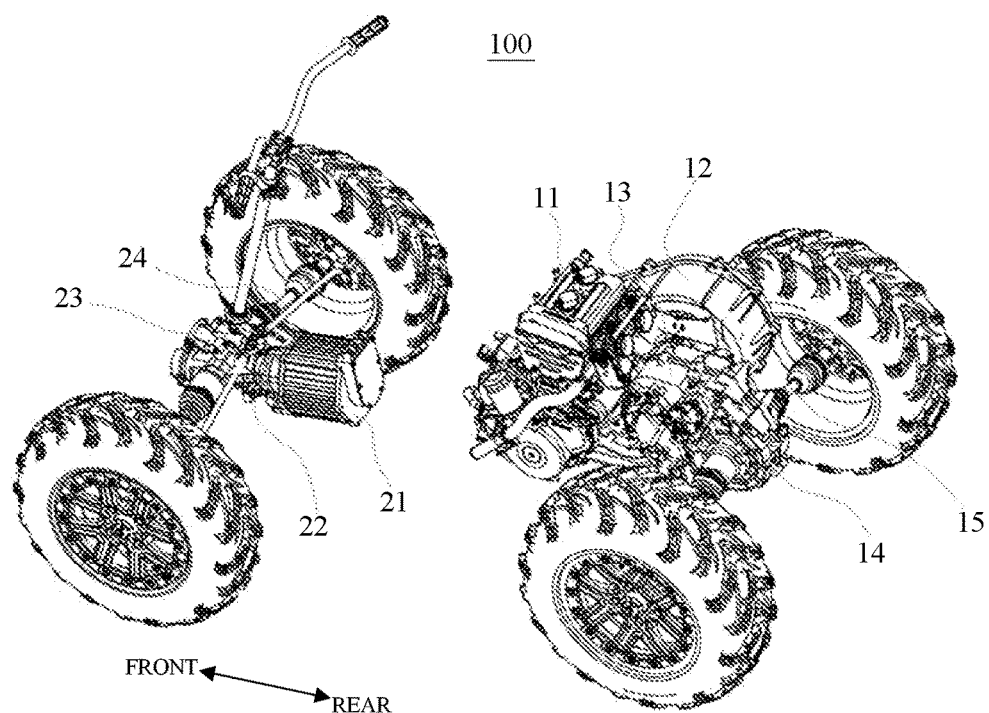
FIG. 3 is a schematic view of a hybrid power system according to other embodiments of the present disclosure.

As illustrated in FIG. 2 and FIG. 3, the hybrid power system 100 includes an engine 11, a continuously variable transmission 12, a first transmission 13, a first main decelerator 14, and a first half shaft 15. Power is transferred between the continuously variable transmission 12 and the engine 11; power is transferred between the first transmission 13 and the continuously variable transmission 12; power is transferred between the first main decelerator 14 and the first transmission 13; and power is transferred between the first half shaft 15 and the first main decelerator 14. The engine 11 serves as a main power source of the vehicle, and when the vehicle is in a fuel-powered high-efficiency zone, the engine 11 may start running. The engine 11 first transfers power to the continuously variable transmission 12, and in turn the continuously variable transmission 12 transfers the power by using a transmission belt in cooperation with driving and driven wheels of variable working diameters, to achieve a continuous change in a transmission ratio between the engine 11 and the continuously variable transmission 12, thereby obtaining the best cooperation between the continuously variable transmission 12 and working conditions of the engine 11.

In addition, power is transferred between the first transmission 13 and the continuously variable transmission 12, and power is transferred between the first main decelerator 14 and the first transmission 13. The first transmission 13 is a mechanism for changing speed and torque from the engine 11. The first transmission 13 may change a transmission ratio between an output shaft and an input shaft in a fixed or stepped manner. The first main decelerator 14 may also change the torque and speed in the hybrid power system 100, increasing a torque from the first transmission 13 while reducing speed and changing a transmission direction of the torque. In addition, the power from the first main decelerator 14 is transmitted to the first half shaft 15.

As illustrated in FIGS. 2 and 3, the hybrid power system 100 further includes: a motor 21 at least for outputting power, a second transmission 22, a second main decelerator 23, and a second half shaft 24. Power is transferred between the second transmission 22 and the motor 21; power is transferred between the second main decelerator 23 and the second transmission 22; and power is transferred between the second half shaft 24 and the second main decelerator 23. The motor 21 is able to convert electric energy into kinetic energy. The motor 21 is started when the vehicle starts, and the motor 21 works before the engine 11 of the vehicle works in the fuel-powered high-efficiency zone. By taking advantage of low-speed and high-torque characteristics and high mechanical efficiency of the motor 21, the motor 21 is independently used to drive the first half shaft 15, such that power distribution of the vehicle becomes more reasonable during driving.

One of the first half shaft 15 and the second half shaft 24 is a front half shaft and the other thereof is a rear half shaft. That is, the motor 21 may be used as a driving force source of the front half shaft, and the engine 11 may be used as a driving force source of the rear half shaft. Alternatively, the engine 11 may be used as the driving force source of the front half shaft, and the motor 21 may be used as the driving force source of the rear half shaft. With this arrangement, the front half shaft and the rear half shaft are independently driven by the motor 21 and the engine 11, such that the vehicle may achieve four-wheel drive, and the front half shaft and the rear half shaft may dynamically distribute the driving force to improve the reasonable power distribution of the vehicle when driving.

Thus, the engine 11 drives the first half shaft 15 and the motor 21 drives the second half shaft 24, thereby achieving the four-wheel drive and dynamic distribution of the driving force. On this basis, the hybrid power system 100 with such arrangement may drive the first half shaft 15 through the motor 21 when the vehicle starts, and enjoy the high mechanical efficiency by using the low-speed and high-torque characteristics of the motor 21. The engine 11 is used to provide the driving force to the vehicle after the vehicle reaches a certain speed. At this time, the engine 11 works in the fuel-powered high-efficiency zone, and hence the vehicle works in the high-efficiency zone, thereby achieving energy conservation and emission reduction.

According to an embodiment of the present disclosure, as illustrated in FIG. 2, the continuously variable transmission 12 and the first transmission 13 are both arranged on the engine 11, and a first transmission shaft 16 is coupled between the first transmission 13 and the first main decelerator 14. Specifically, the first transmission shaft 16 is coupled between the first transmission 13 and the first main decelerator 14, and the first transmission shaft 16, together with the first transmission 13 and the first main decelerator 14, transmits the power of the engine 11 to wheels 200, to generate the driving force for the vehicle. Moreover, the continuously variable transmission 12, the first transmission 13 and the engine 11 are positioned close to a middle part of the vehicle, such that the center of gravity of the vehicle is close to a middle position, and thus the vehicle is more stable when driving.

As illustrated in FIG. 2, the continuously variable transmission 12 and the first transmission 13 are arranged on both axial sides of the engine 11. With this arrangement, space among the continuously variable transmission 12, the first transmission 13 and the engine 11 may be reasonably utilized, and the engine 11, the continuously variable transmission 12 and the first transmission 13 may form an overall power structure, to improve compactness of the hybrid power system 100. In addition, the continuously variable transmission 12 and the first transmission 13 with such arrangement may also balance load on both sides of the engine 11 and improve the stability of the vehicle.

According to another embodiment of the present disclosure, as illustrated in FIG. 3, the first transmission 13 has a first transmission output end, the first main decelerator 14 has a first main decelerator input end, the first transmission output end is coupled to the first main decelerator input end, and power is transferred between the first transmission output end and the first main decelerator input end. With such arrangement, the first transmission shaft 16 between the first main decelerator 14 and the first transmission 13 may be omitted, and instead, the first transmission 13 and the first main decelerator 14 may be directly coupled, which can facilitate the assembly of the vehicle and reduce the cost. In addition, with such arrangement, the engine 11, the continuously variable transmission 12 and the first transmission 13 as a whole may move backward, and a part of a middle area is vacant, which can facilitate the assembly of other components.

As illustrated in FIG. 3, the engine 11 and the first transmission 13 are arranged on a same side of the continuously variable transmission 12, and the first transmission 13 is fixed on a side of the engine 11 adjacent to the first half shaft 15. With this arrangement, the space among the continuously variable transmission 12, the first transmission 13 and the engine 11 may be reasonably utilized. That is, the engine 11 and the first transmission 13 may be fixedly coupled in a front-rear direction. The first transmission 13 with such arrangement can realize direct power transmission with the first main decelerator 14 at a rear side of the engine 11, which may improve the integration among the engine 11, the continuously variable transmission 12, the first transmission 13 and the first main decelerator 14.

As illustrated in FIG. 3, the first transmission 13 includes a shell 131 and a first transmission assembly 132; the first main decelerator 14 includes a first main deceleration assembly 141; and the first transmission assembly 132 and the first main deceleration assembly 141 are both arranged in the shell 131. The first transmission assembly 132 and the first main deceleration assembly 141 share the shell 131, which can facilitate the arrangement of the first transmission 13 and the first main decelerator 14, save space, and further improve the integration of the hybrid power system 100.

Figure 4:
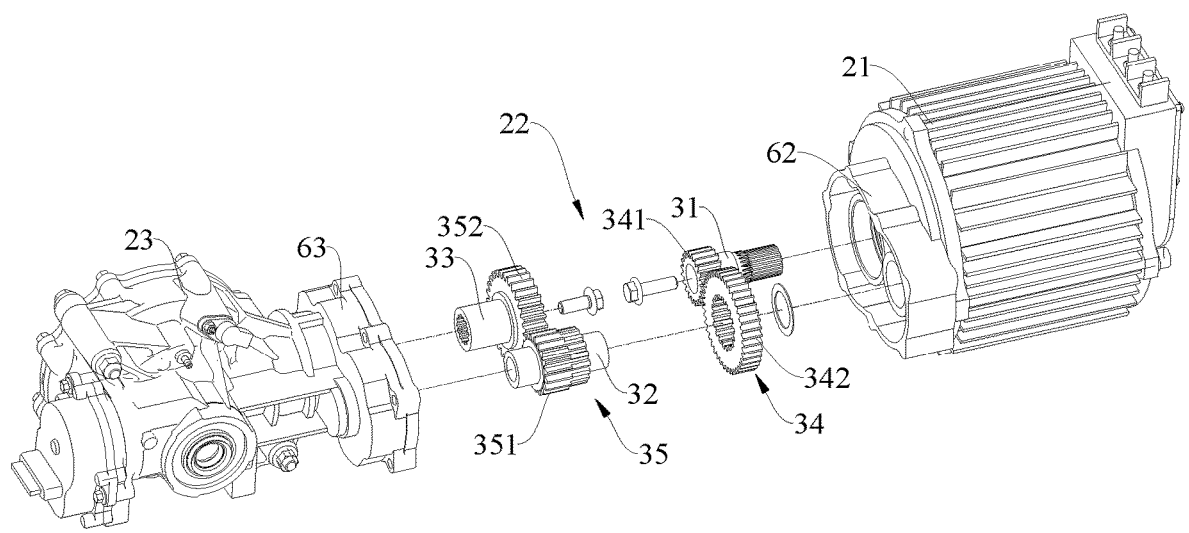
FIG. 4 is a schematic view of a second transmission according to some embodiments of the present disclosure.
Figure 5:
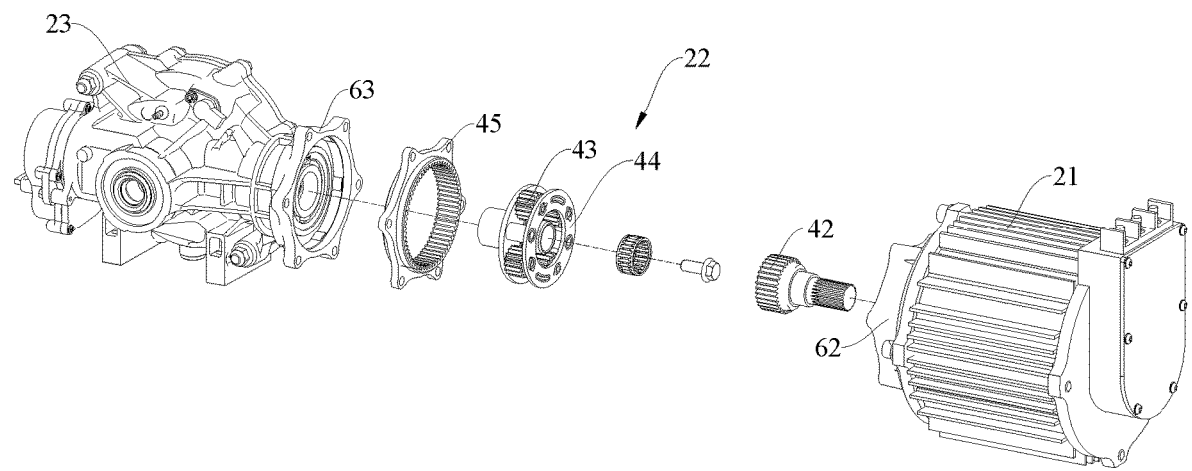
FIG. 5 is a schematic view of a second transmission according to other embodiments of the present disclosure.
Figure 6:
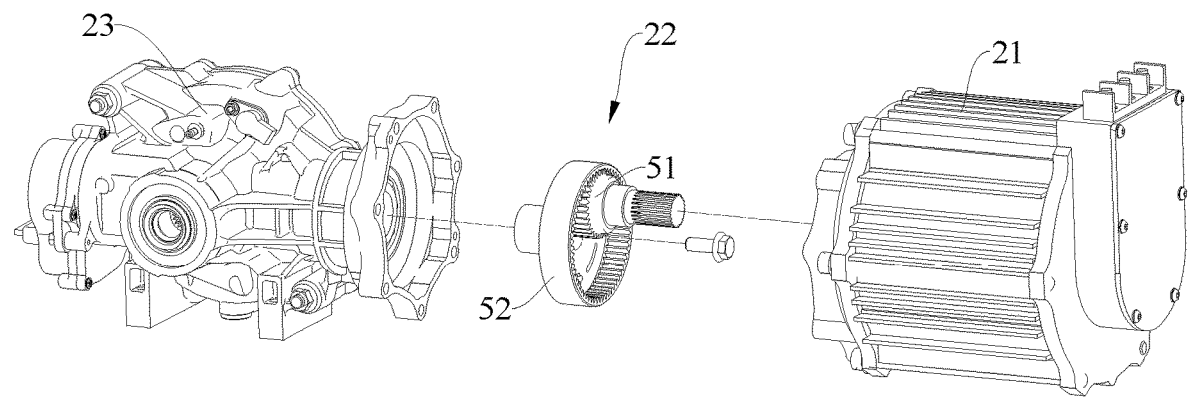
FIG. 6 is a schematic view of a second transmission according to still other embodiments of the present disclosure.
Figure 7:
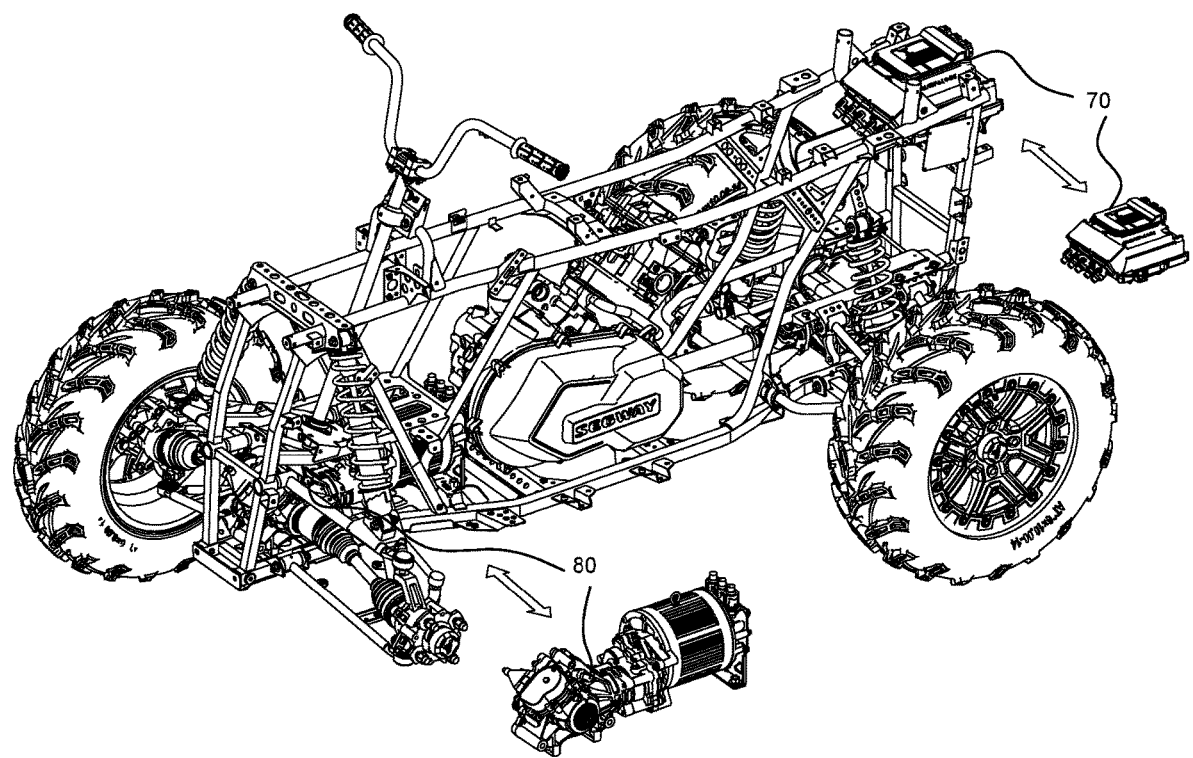
FIG. 7 is a schematic view of a controller and a vehicle speed sensor according to an embodiment of the present disclosure.
Figure 8:
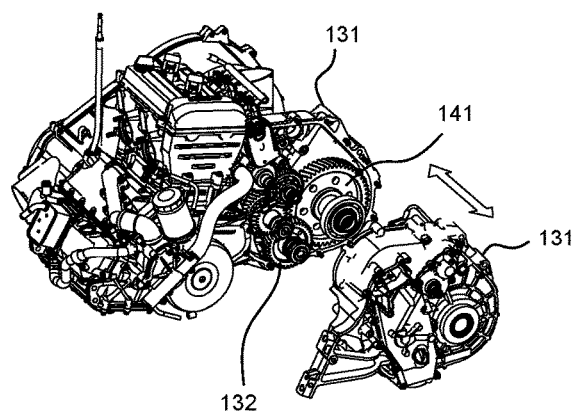
FIG. 8 is a schematic view of a first transmission and a first main decelerator according to an embodiment of the present disclosure.

According to some embodiments of the present disclosure, as illustrated in FIGS. 4 to 6, the second transmission 22 is fixed between the motor 21 and the second main decelerator 23. With this arrangement, the internal space of the vehicle can be reasonably utilized, and the compactness among the second transmission 22, the motor 21 and the second main decelerator 23 can be improved. The power generated by the motor 21 is transmitted to the second half shaft 24 through the second transmission 22 and the second main decelerator 23 successively, to drive the vehicle to move.

According to an embodiment of the present disclosure, as illustrated in FIG. 4, the second transmission 22 includes a first shaft 31, a second shaft 32, a third shaft 33, a first reduction gear set 34 and a second reduction gear set 35. Power is transferred between the first shaft 31 and the motor 21. The first reduction gear set 34 is arranged between the first shaft 31 and the second shaft 32, and the second reduction gear set 35 is arranged between the second shaft 32 and the third shaft 33. Power is transferred between the third shaft 33 and the second main decelerator 23. By arranging the first reduction gear set 34 between the first shaft 31 and the second shaft 32 and arranging the second reduction gear set 35 between the second shaft 32 and the third shaft 33, the first reduction gear set 34 and the second reduction gear set 35 can achieve speed reduction between the motor 21 and the second main decelerator 23. The second transmission 22 is a two-stage decelerator.

Furthermore, the first reduction gear set 34 includes a first gear 341 and a second gear 342 meshing with each other; the second reduction gear set 35 includes a third gear 351 and a fourth gear 352 meshing with each other. The first gear 341 is arranged on the first shaft 31; the second gear 342 and the third gear 351 are arranged on the second shaft 32; and the fourth gear 352 is arranged on the third shaft 33. The first gear 341 and the second gear 342 are in meshing transmission, such that power of the first shaft 31 can be transmitted to the second shaft 32. The second gear 342 and the third gear 351 share the second shaft 32, such that the power can be transmitted to the second gear 342. The third gear 351 and the fourth gear 352 are in meshing transmission, such that the power can be transmitted to the fourth gear 352, i.e., the third shaft 33. Power is transferred between the first shaft 31 and the motor 21, and power is transferred between the third shaft 33 and the second main decelerator 23, such that the power of the motor 21 can be transmitted to the second main decelerator 23.

According to another embodiment of the present disclosure, as illustrated in FIG. 5, the second transmission 22 includes a planetary gear mechanism 41, and the planetary gear mechanism 41 includes a sun gear 42, a planetary gear 43, a planetary carrier 44 and a gear ring 45. The planetary gear 43 is arranged on the planetary carrier 44 and meshes between the sun gear 42 and the gear ring 45, and power is transferred between the sun gear 42 and the motor 21. One of the planetary carrier 44 and the gear ring 45 is fixed, and the other thereof realizes power transmission with the second main decelerator 23. The motor 21 drives the sun gear 42 to bring the planetary gear 43 into rotation. When the gear ring 45 is fixed with the second main decelerator 23, power is transferred between the planetary carrier 44 and the second main decelerator 23. When the planetary carrier 44 is fixed with the second main decelerator 23, power is transferred between the gear ring 45 and the second main decelerator 23. The planetary gear mechanism 41 has characteristics of light weight, small volume, large transmission ratio range, high efficiency, stable operation and low noise.

According to another embodiment of the present disclosure, as illustrated in FIG. 6, the second transmission 22 is a decelerator with parallel shafts and internal meshing, and includes a driving gear 51 and a driven gear 52. Power is transferred between the driving gear 51 and the motor 21. The driven gear 52 includes a gear ring, the driving gear 51 meshes in the gear ring, and power is transferred between the driven gear 52 and the second main decelerator 23. By using the internal meshing transmission between the driving gear 51 and the driven gear 52, speed reduction can be achieved, and the space in the second transmission 22 can be saved.

As illustrated in FIGS. 4-6, a first half shell 62 is arranged on a side of the motor 21 facing the second main decelerator 23, and a second half shell 63 is arranged on a side of the second main decelerator 23 facing the motor 21. The first half shell 62 and the second half shell 63 are arranged opposite to each other and form a shell of the second transmission 22. That is, the first half shell 62 is fixedly coupled to the motor 21, the second half shell 63 is coupled to the second transmission 22, and the first half shell 62 and the second half shell 63 are arranged oppositely and form the shell of the second transmission 22. In this way, the shell of the second transmission 22 can be formed conveniently without additionally providing a shell of the second transmission 22. According to some embodiments of the present disclosure, the first half shell 62 may be integrally formed with a shell of the motor 21, the second half shell 63 may be integrally formed with a shell of the second main decelerator 23, and such an arrangement can improve structural strength of the shell of the second transmission 22.

According to some embodiments of the present disclosure, the motor 21 may be one of an electric motor and an electric generator 21. When the motor 21 is an electric motor, the electric motor only functions as a power output source, and power is transferred between the electric motor and the second transmission 22 and is transferred to the second half shaft 24 through the second main decelerator 23. When the motor 21 is an electric generator, the electric generator may function not only as a power source, but also as a generator. When the vehicle starts, the electric generator converts electric energy into kinetic energy; when the vehicle runs stably, the electric generator converts kinetic energy into electric energy, that is, the vehicle may be charged, and the electric energy can be supplied to the vehicle.

In addition, the hybrid power system 100 further includes a controller 70 and a vehicle speed sensor 80 electrically coupled to the controller 70. The controller 70 controls the engine 11 to start, after the motor 21 starts and a vehicle speed detected by the vehicle speed sensor 80 reaches a predetermined value. Through the arrangement of the controller 70 and the vehicle speed sensor 80, the motor 21 functions as the power source when the vehicle starts; after a certain vehicle speed is reached, the controller 70 controls the engine 11 to start, and the engine 11 works in the high-efficiency zone, to allow the vehicle to work in the high-efficiency zone of the engine 11, thereby achieving energy conservation and emission reduction.

Specific structures of two kinds of hybrid power systems 100 will be described below with reference to FIGS. 2 and 3.

As illustrated in FIG. 2, the hybrid power system 100 according to an embodiment of the present disclosure may include: an engine 11, a continuously variable transmission 12, a first transmission 13, a first main decelerator 14, a first half shaft 15, a first transmission shaft 16, a motor 21, a second transmission 22, a second main decelerator 23 and a second half shaft 24. Power is transferred between the continuously variable transmission 12 and the engine 11, and the continuously variable transmission 12 is fixed on one axial side of the engine 11. Power is transferred between the first transmission 13 and the continuously variable transmission 12, and the first transmission 13 is fixed on the other axial side of the engine 11. Power is transferred between one end of the first transmission shaft 16 and the first transmission 13; power is transferred between the first main decelerator 14 and the other end of the first transmission shaft 16; and power is transferred between the first half shaft 15 and the first main decelerator 14. Power is transferred between the second transmission 22 and the motor 21; power is transferred between the second main decelerator 23 and the second transmission 22, and the second transmission 22 is fixed between the motor 21 and the second main decelerator 23; power is transferred between the second half shaft 24 and the second main decelerator 23. The first half shaft 15 is a rear half shaft and the second half shaft 24 is a front half shaft; or the first half shaft 15 is a front half shaft and the second half shaft 24 is a rear half shaft.

As illustrated in FIG. 3, the hybrid power system 100 according to an embodiment of the present disclosure may include: an engine 11, a continuously variable transmission 12, a first transmission 13, a first main decelerator 14, a first half shaft 15, a motor 21, a second transmission 22, a second main decelerator 23 and a second half shaft 24. Power is transferred between the continuously variable transmission 12 and the engine 11, and the continuously variable transmission 12 is fixed on one axial side of the engine 11. Power is transferred between the first transmission 13 and the continuously variable transmission 12, and power is transferred between the first main decelerator 14 and the first transmission 13, which is direction transmission. That is, an output end of the first transmission 13 directly transmits power to an input end of the first main decelerator 14, without additionally arranging any transmission shaft. The first transmission 13 is fixed between the engine 11 and the first main decelerator 14. Power is transferred between the first half shaft 15 and the first main decelerator 14; power is transferred between the second transmission 22 and the motor 21; power is transferred between the second main decelerator 23 and the second transmission 22; the second transmission 22 is fixed between the motor 21 and the second main decelerator 23; and power is transferred between the second half shaft 24 and the second main decelerator 23. The first half shaft 15 is a rear half shaft and the second half shaft 24 is a front half shaft; or the first half shaft 15 is a front half shaft and the second half shaft 24 is a rear half shaft.

An all-terrain vehicle S according to embodiments of a second aspect of the present disclosure includes the hybrid power system 100 of the above embodiments, a frame 300, and wheels 200. The hybrid power system 100 is mounted to the frame 300, and the wheels 200 may be mounted at shaft ends of the first half shaft 15 and the second half shaft 24, correspondingly. The wheels 200 include front wheels and rear wheels.

An operation mode of the all-terrain vehicle S will be described below.

In an independent operation mode of the motor 21, the motor 21 drives the all-terrain vehicle S independently without the help of the engine 11. The motor 21 drives the front wheels of the all-terrain vehicle S through the second transmission 22, the second main decelerator 23 and the second half shaft 24. In addition, the motor 21 is used for driving at low speed, which reduces fuel consumption and is suitable for travelling in the city.

In a hybrid power operation mode that is the most commonly used operation mode for all-terrain vehicle S, fuel consumption and emission can be reduced through reasonable power distribution. The all-terrain vehicle S moves to a certain speed under the drive of the motor 21, and the engine 11 starts and works in the high-efficiency zone, thereby reducing the fuel consumption of the all-terrain vehicle S. The engine 11 drives the rear wheels of the all-terrain vehicle S through the continuously variable transmission 12, the first transmission 13, the first main decelerator 14 and the first half shaft 15, and the motor 21 drives the front wheels of the all-terrain vehicle S through the second transmission 22, the second main decelerator 23 and the second half shaft 24.

In a braking control operation mode: more braking energy can be recovered by optimizing the relationship between a braking torque of the motor 21 and a brake. The front wheels provide an electricity-generating torque to the motor 21 through the second half shaft 24, the second main decelerator 23 and the second transmission 22. The motor 21 is converted into the electric generator 21 to generate electricity and charge a battery assembly, thereby achieving a purpose of energy capture during braking. When forced braking is performed, the controller receives a signal from a brake pedal sensor and increases the electricity-generating torque of the motor 21 by adjusting the controller of the motor 21.

In the descriptions of the embodiments of the present application, it is to be understood that, terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," "circumferential" or the like indicate the orientation or positional relationship based on the orientation or positional relationship illustrated in the drawings. These terms are merely for convenience and simplification of description, rather than indicate or imply that referred device or element must have a specific orientation, or be constructed and operated in a specific orientation, and therefore cannot be understood as limitation on the present disclosure.

Reference throughout this specification to terms "one embodiment," "some embodiments," "an exemplary embodiment," "an example," "a specific example," or "some examples," means that a particular feature, structure, material, or characteristic described in connection with the embodiment or example can be included in at least one embodiment or example of the present disclosure. In this specification, the above terms are not necessarily referring to the same embodiment or example.

Although embodiments of the present disclosure have been illustrated and described above, it should be understood by those skilled in the art that changes, modifications, alternatives, and variations may be made in the embodiments without departing from principles and purposes of the present disclosure. The scope of this disclosure is limited by the claims and their equivalents.

What is claimed is:

1. A hybrid power system, comprising:
an engine;
a continuously variable transmission, power being transferred between the continuously variable transmission and the engine;
a first transmission, power being transferred between the first transmission and the continuously variable transmission;
a first main decelerator, power being transferred between the first main decelerator and the first transmission;
a first half shaft, power being transferred between the first half shaft the first main decelerator;
a motor at least for outputting power;
a second transmission, power being transferred between the second transmission and the motor;
a second main decelerator, power being transferred between the second main decelerator and the second transmission; and
a second half shaft, power being transferred between the second half shaft and the second main decelerator, wherein one of the first half shaft and the second half shaft is a front half shaft, and the other of the first half shaft and the second half shaft is a rear half shaft,
wherein the second transmission is fixed between the motor and the second main decelerator.

2. The hybrid power system according to claim 1, wherein the continuously variable transmission and the first transmission are arranged on the engine, and a first transmission shaft is coupled between the first transmission and the first main decelerator.

3. The hybrid power system according to claim 2, wherein the continuously variable transmission and the first transmission are arranged on both axial sides of the engine.

4. The hybrid power system according to claim 1, wherein the first transmission has a first transmission output end, the first main decelerator has a first main decelerator input end, and the first transmission output end is transmissively coupled to the first main decelerator input end.

5. The hybrid power system according to claim 4, wherein the engine and the first transmission are arranged on a same side of the continuously variable transmission, and the first transmission is fixed on a side of the engine adjacent to the first half shaft.

6. The hybrid power system according to claim 4, wherein the first transmission comprises a shell and a first transmission assembly; the first main decelerator comprises a first main deceleration assembly; and the first transmission assembly and the first main deceleration assembly are arranged in the shell.

7. The hybrid power system according to claim 1, wherein:
the second transmission comprises a first shaft, a second shaft, a third shaft, a first reduction gear set and a second reduction gear set;
the first reduction gear set comprises a first gear arranged on the first shaft and a second gear arranged on the second shaft and meshing with the first gear;
the second reduction gear set comprises a third gear arranged on the second shaft and a fourth gear arranged on the third shaft and meshing with the third gear;
power is transferred between the first shaft and the motor, and power is transferred between the third shaft and the second main decelerator.

8. The hybrid power system according to claim 1, wherein the second transmission comprises a planetary gear mechanism, and the planetary gear mechanism comprises a sun gear, a planetary carrier, a gear ring, and a planetary gear arranged on the planetary carrier and meshing between the sun gear and the gear ring;
power is transferred between the sun gear and the motor, one of the planetary carrier and the gear ring is fixed, and power is transferred between the other of the planetary carrier and the gear ring and the second main decelerator.

9. The hybrid power system according to claim 1, wherein:
the second transmission is a decelerator with parallel shafts and internal meshing, and comprises a driving gear and a driven gear;
the driven gear comprises a gear ring, and the driving gear meshes in the gear ring;
power is transferred between the driving gear and the motor, and power is transferred between the driven gear and the second main decelerator.

10. The hybrid power system according to claim 1, wherein the motor is one of an electric motor and an electric generator.

11. The hybrid power system according to claim 1, further comprising a controller and a vehicle speed sensor electrically coupled to the controller, wherein the controller controls the engine to start after the motor starts and a vehicle speed detected by the vehicle speed sensor reaches a predetermined value.

12. The hybrid power system according to claim 1, wherein the continuously variable transmission is fixed on an axial side of the engine, and the first transmission is fixed between the engine and the first main decelerator.

13. The hybrid power system according to claim 1, wherein the continuously variable transmission, the first transmission and the engine are positioned close to a middle part of the vehicle.

14. The hybrid power system according to claim 1, wherein a first half shell is arranged on a side of the motor facing the second main decelerator, and a second half shell is arranged on a side of the second main decelerator facing the motor;
the first half shell and the second half shell are arranged opposite to each other and form a shell of the second transmission.

15. The hybrid power system according to claim 14, wherein the first half shell is fixedly coupled to the motor, and the second half shell is coupled to the second transmission.

16. The hybrid power system according to claim 14, wherein the first half shell is integrally formed with a shell of the motor, and the second half shell is integrally formed with a shell of the second main decelerator.

17. A hybrid power system, comprising:
an engine;
a continuously variable transmission fixed on a first axial side of the engine, power being transferred between the continuously variable transmission and the engine;
a first transmission fixed on a second axial side of the engine, power being transferred between the first transmission and the continuously variable transmission;
a first transmission shaft, power being transferred between a first end of the first transmission shaft and the first transmission;
a first main decelerator, power being transferred between the first main decelerator and a second end of the first transmission shaft;
a first half shaft, power being transferred between the first half shaft and the first main decelerator;
a motor at least for outputting power;
a second transmission, power being transferred between the second transmission and the motor;
a second main decelerator, power being transferred between the second main decelerator and the second transmission, and the second transmission being fixed between the motor and the second main decelerator;
a second half shaft, power being transferred between the second half shaft and the second main decelerator, wherein one of the first half shaft and the second half shaft is a front half shaft, and the other of the first half shaft and the second half shaft is a rear half shaft.

18. An all-terrain vehicle, comprising a hybrid power system, wherein the hybrid power system comprises:
an engine;
a continuously variable transmission, power being transferred between the continuously variable transmission and the engine;
a first transmission, power being transferred between the first transmission and the continuously variable transmission;
a first main decelerator, power being transferred between the first main decelerator and the first transmission;
a first half shaft, power being transferred between the first half shaft the first main decelerator;
a motor at least for outputting power;
a second transmission, power being transferred between the second transmission and the motor;
a second main decelerator, power being transferred between the second main decelerator and the second transmission; and
a second half shaft, power being transferred between the second half shaft and the second main decelerator, wherein one of the first half shaft and the second half shaft is a front half shaft, and the other of the first half shaft and the second half shaft is a rear half shaft,
wherein the second transmission is fixed between the motor and the second main decelerator.

19. The all-terrain vehicle according to claim 18, further comprising:
a frame, the hybrid power system being mounted to the frame; and
wheels comprising front wheels and rear wheels and mounted at shaft ends of the first half shaft and the second half shaft.

* * * * *